United States Patent [19]
Brittin

[11] Patent Number: 4,886,449
[45] Date of Patent: Dec. 12, 1989

[54] VACUUM BRAZING OF ALUMINUM ALLOY WORKPIECES

[75] Inventor: Craig E. Brittin, Lockport, N.Y.

[73] Assignee: General Motors Corporation, Detroit, Mich.

[21] Appl. No.: 204,830

[22] Filed: Jun. 10, 1988

Related U.S. Application Data

[62] Division of Ser. No. 937,888, Dec. 4, 1982.

[51] Int. Cl.[4] ............................................. F27B 9/02
[52] U.S. Cl. ................................. 432/121; 432/133; 432/128; 432/11
[58] Field of Search ............... 432/2, 5, 11, 128, 133, 432/121

[56] References Cited

U.S. PATENT DOCUMENTS

| | | | |
|---|---|---|---|
| 3,063,878 | 11/1962 | Wilson | 432/11 |
| 3,778,221 | 12/1973 | Bloom | 432/133 |
| 3,905,758 | 9/1975 | Moussou et al. | 432/11 |
| 4,430,055 | 2/1984 | Sugiyama | 432/11 |

Primary Examiner—Henry C. Yuen
Attorney, Agent, or Firm—George A. Grove

[57] ABSTRACT

An improved practice for the vacuum brazing of aluminum alloy workpieces in a multi-chamber braze furnace is disclosed. When magnesium-containing aluminum alloys are brazed in a furnace having a braze chamber and adjacent exit chamber, there may be advantage in providing thermal barriers between a load of hot brazed workpieces and the furnace walls of the exit chamber.

2 Claims, 1 Drawing Sheet

VACUUM BRAZING OF ALUMINUM ALLOY WORKPIECES

This is a division of application Ser. No. 937,888, filed on Dec. 4, 1986 pending.

This invention relates to the vacuum brazing of magnesium-containing aluminum alloy workpieces. More specifically, this invention relates to improvements in practices for the large scale vacuum brazing of such aluminum workpieces in brazing furnaces.

BACKGROUND OF THE INVENTION

The manufacture of aluminum heat exchangers such as air conditioner evaporator cores and radiators is a sophisticated technology in that it requires the simultaneous formation of many brazed joints between the aluminum alloy tubes, fins and headers or tanks. In order to supply molten braze alloy at the intended joints, at least some of such components, for example, the tubes, are formed of two or more aluminum alloy layers in a sandwich-type sheet construction. In the sandwich, the principal layer or base layer is an aluminum alloy in sheet form selected for its strength and corrosion resistance requirements. Roll bonded to one or both surfaces of such base layer is a suitable aluminum brazing alloy composition. The aluminum braze alloy composition comprises aluminum with an appreciable amount of silicon such that the composition will melt and flow on the base layer at a brazing temperature below the melting point of the base layer.

In the production of such aluminum heat exchangers, aluminum alloy sheet materials are shaped and assembled together to form the desired part. The assembly must then be heated in a suitable environment to melt the braze alloy layers, cause them to flow and wet underlying and adjacent surfaces and form brazing fillets at many joints at the same time. In some applications, such brazing operations have been carried out in vacuum furnaces. In this practice, magnesium in suitable quantities is incorporated into either the base aluminum alloy composition, the braze alloy composition or both. When the assembled aluminum sheet components are heated in vacuum to a braze temperature, the magnesium vaporizes or sublimes to getter the environment in the vicinity of the molten alloy to facilitate wetting of the aluminum surfaces to be joined. This practice is disclosed, for example, in U.S. Pat. Nos. 3,321,828; 3,322,517; 3,373,482 and 3,373,483.

Where large numbers of aluminum workpieces are to be brazed in a continuous process, it is generally preferable to employ a multi-chamber vacuum brazing furnace. In the operation of such a continuously operating multi-chamber furnace, a plurality of workpieces are sequentially advanced into the inlet of the furnace through the respective isolatable operating chambers and the brazed products removed from the furnace outlet.

A suitable furnace might comprise, for example, three stages or chambers. The furnace may be aligned with the chambers in a straight flow path. The inlet and outlet for each chamber can be closed off with suitable doors so that the temperature, pressure and other environmental parameters therein may be controlled. In a typical flow-through vacuum brazing furnace, a group of assembled heat exchangers is first introduced into a preheat chamber where the absolute pressure is reduced to about $5 \times 10^{-3}$ torr and the workpieces are heated by use of radiant heating elements to a temperature of about 800° F. The preheated workpieces are then transported to the next chamber where the braze operation takes place. The pressure is reduced to a level of $10^{-5}$ to $10^{-6}$ torr. The temperature is increased to about 1100° F. such that the braze alloy cladding on surfaces of at least some of the workpiece components melts and flows under capillary action to the joints to be formed. At the high temperatures and low pressures of the braze chamber, magnesium vapor evolves from the alloy to react with residual oxidizing constituents in the chamber that could inhibit wetting of the workpieces by the molten braze alloy and the formation of a braze joint. The still-hot workpieces are then moved into the third chamber which serves as an exiting vestibule. The exit chamber is initially evacuated to a low pressure suitably $5 \times 10^{-3}$ torr. As soon as the workpieces have entered the chamber and it has been isolated from the braze chamber, dry air is admitted to effect some cooling of the workpieces and to raise the pressure in the chamber to that of the atmosphere. The outlet door of this chamber is then opened and the workpieces are removed from the furnaces into ambient air for further cooling.

In the prolonged operation of continuous multi-chamber vacuum brazing furnaces of the type described, problems have arisen that were not predictable from batch-type or other multi-chamber brazing operations. Successful continuous operation of these flow-through furnaces depends upon repeatedly obtaining the desired operating conditions in each chamber. Some flow-through furnaces are relatively large, having chambers, for example, that may be 6 feet wide by 10 feet high by 20 feet long. More than 100 automotive air conditioner evaporators may be treated at the same time in each of the three chambers. Magnesium that is evolved from the workpieces in the braze and exit chambers tends to collect as magnesium or magnesium oxide on the furnace wall surfaces. The furnaces must be cleaned from time to time to remove this oxide. In some such brazing lines, continuous operations have been interrupted by the occurrence of excessively high pressures in the exit and braze sections as the workpieces are shuttled into the exit chamber. The high pressures in the braze section overwhelm the vacuum pumps and cause shutdown of the braze line.

It is an object of the present invention to provide an improved practice for the operation of such multi-chamber aluminum vacuum brazing furnaces to prevent such high pressure events in the braze chamber and avoid interruptions of the desired continuous brazing operations. It is another object of the present invention to provide an improvement in the design and construction of the exit chamber of such vacuum brazing furnaces for more efficient removal of accumulated magnesium oxide deposits and for avoiding high pressure impulses that upset operations in the braze chamber of the furnace.

BRIEF SUMMARY OF THE INVENTION

In accordance with a preferred embodiment of my invention, these and other objects and advantages are accomplished by providing suitable heat transfer barriers in the exit chamber of the furnace positioned between the bundle of hot brazed workpieces and the relatively cold walls of the exit chamber of the vacuum furnace. The use of such barriers is based on the following discovery.

I have discovered that in the normal operation of aluminum vacuum brazing furnaces of the type described above, magnesium oxide particles accumulate on the walls of the exit chamber of the furnace. These walls are typically maintained at temperatures of about 150° F. to 170° F. They provide a natural surface for deposit of magnesium evolved from the brazed workpieces or the magnesium oxide particles formed as a consequence of the magnesium reacting with oxygen, water or other residual oxidizing constituents in the chamber. The buildup of magnesium oxide on the furnace walls continues as the furnace operates. The rate of buildup is a function of the number of workpieces being brazed and the resulting total surface area—especially the area exposed to the cool wall surfaces.

In addition to magnesium oxide buildup on the furnace exit chamber walls, moisture is adsorbed on the magnesium oxide particles and walls. Moisture is introduced into the exit chamber when the exit door is opened to remove the workpieces from the furnace. After there has been sufficient buildup of magnesium oxide and adsorbed moisture on the walls of the exit chamber, difficulties may then be experienced in the braze chamber. If the furnace is otherwise functioning properly, I believe that the high pressure events interrupting brazing operations are initiated when a load of hot brazed workpieces is introduced into the exit chamber. Despite the low pressure in the chamber, some moisture remains on the walls of the furnace. Heat radiated from the brazed workpieces to the cold walls drives moisture into the chamber where it reacts with magnesium still evolving from the workpieces. The reaction of the magnesium with the moisture produces hydrogen or other gases that increase the pressure in the exit chamber. While the door between the braze chamber and the exit chamber is opened, the gases enter the braze chamber, adversely affecting pressure control in that critical part of the furnace.

In accordance with my invention, I interpose heat shields between the hot workpieces in the exit chamber and the relatively cold walls. These heat shields may suitably be low carbon steel sheets or strips that hang in the radiation path between the workpieces and the furnace walls. Thus, these heat shields are the first furnace surfaces to be heated rather than the walls. Preferably, they are of a solid material having sufficient mass to hold their temperature below about 900° F. but such that the temperature may rise high enough to provide radiant heat transfer to the furnace walls. Moreover, magnesium and magnesium oxide particles deposit on these heat shields. Since the walls are not directly heated by the hot workpieces, the moisture is not immediately driven from them. Before heat is reradiated from the heat shields to the walls, the braze chamber can be sealed from the exit chamber and the vacuum system of the exit chamber can then remove any moisture or other gases that eventually result from the presence of the hot workpieces. Thus, where the quantity and surface area of the workpieces being brazed are such that copious quantities of magnesium are evolved in the exit chamber, my heat shields serve as a buffer to intercept the flow of magnesium and magnesium oxide particles and the thermal radiation from the workpieces toward the walls of the furnace. The shields facilitate the easier removal of magnesium oxide from the furnace and mitigate pressure buildup in the braze chamber.

Other objects and advantages of my invention will become more apparent from a detailed description which follows. In this description, reference will be had to the drawings in which.

DETAILED DESCRIPTION OF THE INVENTION

The practice of my invention will be described in connection with the brazing of aluminum automotive air conditioner evaporators. By way of example, each evaporator is formed by assembling alternate layers of tube-defining sheet alloy and fin stock sheets. The alternate fins and tubes are suitably banded together to form a heat exchanger body for brazing. The outer bounds of the evaporator assembly generally define a rectangular box, e.g., approximately 13 inches long, 8 to 9 inches high and 3 inches wide.

Further by way of example, the tube sheets are formed of a composite braze alloy having a base or core portion of 3005 aluminum alloy and surface layers of 4047 alloy clad thereto by roll bonding. The core alloy nominally contains by weight 0.5 percent magnesium, b 1.2 percent manganese and the balance aluminum. The composition of this alloy is selected for purposes of strength and corrosion resistance of the heat exchanger. The braze alloy has a nominal composition by weight of 12.5 percent silicon, about 0.15 percent magnesium and the balance aluminum. Each clad braze alloy layer constitutes about 10 percent of the thickness of the composite sheet. The composition of the braze alloy is adjusted so it will melt at a temperature range (e.g., 1070°–1080° F.) suitably below the melting temperature of the core alloy. The fin stock alloy may also contain magnesium.

A plurality of assembled heat exchangers, for example, 120, are loaded into a suitable carrier fixture in rows and columns so that the largest faces are exposed. This carrier with the many workpieces for brazing is transported through the furnace as a unit. Continuous operation of a three-compartment in-line furnace to braze carrier loads of this size and arrangement has led to the brazing chamber pressure increase problems described above.

Figure 1:
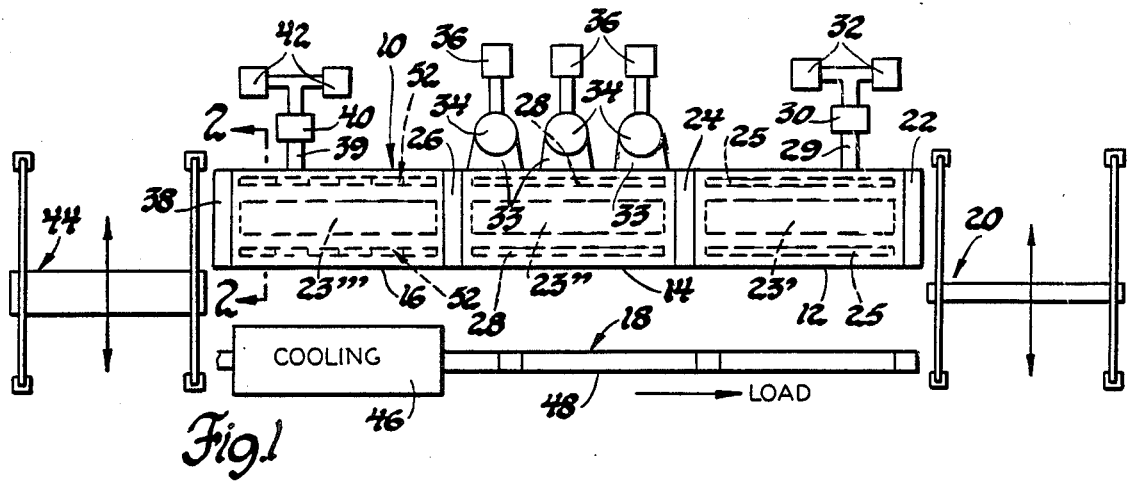
FIG. 1 is a schematic plan view of a flow-through three chamber vacuum brazing furnace and related material handling and processing equipment.

The practice of my invention will now be described by tracing the path of a group of such exchangers through a three-chamber in-line vacuum brazing furnace. Referring to FIG. 1, such a furnace is depicted in schematic plan view at 10. The furnace has a preheat chamber 12, a braze chamber 14, and an exit chamber 16. A carrier fixture containing heat exchangers is suspended from a conveyor 18 at a work station labeled "LOAD". The fixture is then moved to a cross transfer conveyor 20 whereby it is aligned with the entrance door 22 of the preheat chamber 12.

When the preheat chamber 12 is available upon removal of the previous group of assembled heat exchangers, it is backfilled with dry air (−45° F. dew point) through an air inlet (not depicted). Door 22 opens and the load of heat exchangers is moved into the preheat chamber 12. Such a load is depicted in schematic outline at 23'. By way of example, the major dimensions of the preheat chamber which is generally oval in cross section are approximately 6 feet wide by 10 feet high by 20 feet long. The load of heat exchangers to be brazed is about 18 feet long by 6 feet high by 10 inches wide. At the commencement of the brazing operation, doors 22 and 24 are closed to isolate the preheat chamber 12 from the braze chamber 14. Each furnace door opening is about 20 inches wide, and they slide from a closed position to a retracted open position. As soon as preheat chamber 12 is closed, the pressure is reduced in the chamber and the assembly is preheated to about 800° F. by radiant heating elements 25 on each side of the chamber 12. The pressure in the chamber is reduced through duct 29 by means of a rotary lobe blower 30 and two mechanical vacuum pumps 32 operating in parallel with each other downstream from the blower 30. The pressure in the preheat chamber 12 is reduced to about $5 \times 10^{-3}$ torr By way of example, the cycle of moving a group of heat exchangers into the preheat chamber, closing the chamber, reducing the pressure and heating the exchangers, and then moving them into the braze chamber requires about 20 minutes.

It will be appreciated that the operation of this furnace 10 indicated schematically in FIG. 1 is intended to be continuous, and therefore the cycle time in each chamber is the same. Also, each chamber is substantially the same size.

As soon as a previous group of heat exchangers has been carried out of the braze chamber 14 and its exit door 26 has been closed, door 24 between the preheat chamber 12 and the braze chamber 14 is opened and the load of heat exchangers is moved into the braze chamber 14. Door 24 is also closed. Under preferred conditions, the pressure in the braze chamber never exceeds $5 \times 10^{-3}$ torr during operations. The pressure in the braze chamber is then further reduced through ducts 33 by three 35-inch diffusion pumps 34 backed up by mechanical vacuum pumps 36. The braze pressure is about $10^{-5}$ to $10^{-6}$ torr. The load of heat exchangers, indicated as 23" in the braze chamber 14, is further heated by radiant elements 28 on each side to a suitable braze temperature range, for example, 1100°-1110° F. Under these conditions, braze alloy layers on each of the heat exchanger assemblies melts and flows by capillary action to adjacent joints to be formed. This action is promoted by the evolution or sublimation of magnesium from the aluminum alloys. As previously stated, the magnesium serves to further purge the brazing environment of oxidizing constituents which would inhibit effective brazing. The load of heat exchangers is then ready to be transferred to a cooler area so that the heat exchanger bodies can be cooled and the fillets solidified.

Before door 26 is opened, any preceding load is removed from the exit chamber 16. Its exit door 38 is then closed. The chamber 16 is evacuated through duct 39 by means of a rotary lobe blower 40 and two mechanical vacuum pumps 42 to a suitable low pressure of about $5 \times 10^{-3}$ torr. Door 26 is opened and the load of very hot heat exchanger assemblies enters the exit chamber 16 with the chamber at its reduced pressure. The load is designated as 23''' in exit chamber 16. The hot workpieces radiate heat toward the surrounding walls of the furnace and the assemblies continue to emit magnesium. My invention involves a method of modifying the transfer of heat and the deposition of the magnesium in the exit chamber. This practice will be described in more detail below following completion of the description of the overall brazing process.

Figure 2:
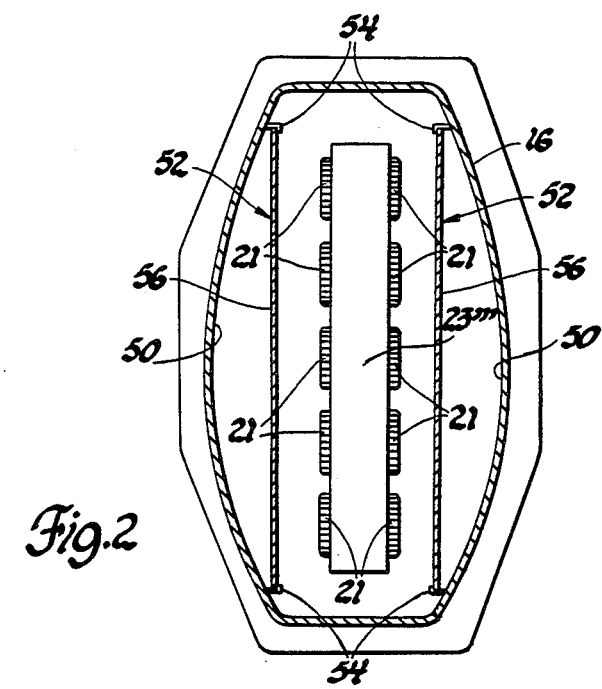
FIG. 2 is a cross sectional view of the exit chamber of the furnace illustrating the heat shields therein.

After door 26 has been closed, isolating the braze chamber 14 from the exit chamber 16, dry air is admitted to the exit chamber from a source no shown and through a conduit not shown into the exit chamber 16 to provide some cooling of the brazed workpieces and to raise the pressure of the chamber 16 so that the load 23''' of workpieces 21 (FIG. 2) can be removed to the atmosphere. The dry air with a dew point of about $-45°$ F., and heat radiated from the hot heat exchangers to the cold furnace walls, lowers the temperature of the load of heat exchangers to about 1000° F. Door 38 is then opened and the load moved to a cross transfer conveyor 44, which is appropriately shielded to prevent operator contact with the hot workpieces. The cross transfer conveyor 44 lines the load up with transfer conveyor 18, which receives the load of hot workpieces and transfers it to a cooling zone 46 at which outside air is blown on the brazed workpieces to reduce the temperature to approximately ambient temperature. The load is transferred to an unload station 48 at which they are removed from the conveyor 18.

As summarized above, there is difficulty in maintaining continuous and efficient operation of the furnace because of a sudden and excessive increase in pressure in the braze chamber 14 after door 26 is opened and a load 23 of heat exchangers is transferred into exit chamber 16. At the time of this transfer, it will be recalled that the pressure in the braze chamber 14 is initially about $10^{-5}$ to $10^{-6}$ torr and the pressure in the exit chamber 16 is about $5 \times 10^{-3}$ torr. Normal design of the furnace requires that the pressure in the braze chamber not greatly exceed $5 \times 10^{-3}$ torr so that the diffusion pumps 34 are not overloaded. However, it has been observed with a load of heat exchangers such as that described above that after prolonged continuous operation of many days, sudden pressure increases to $70 \times 10^{-3}$ torr or more are experienced which may cause a protective shut down of the diffusion units. It has been determined that such pressure increase may occur even though there are no furnace leaks and the vacuum systems are working properly. It has been my observation that the pressure increase occurs after there has been a buildup of magnesium or magnesium oxide particles on the relatively cold walls of the furnace (indicated at 50 in FIG. 2). The walls 50 of the whole furnace are water jacketed (not shown so that the wall temperature during operation does not exceed 150°-170° F. for reasons of operator safety and structural strength. When a carrier load 23''' of hot brazed heat exchangers 21 enters the exit chamber 16, magnesium is still being vaporized. Much of it is believed to react with oxygen or water vapor in the chamber and form particles of magnesium oxide which normally would be deposited on the relatively cold furnace inner walls 50. When the carrier loads are removed from the furnace, ambient air enters and remains there momentarily during each brazing cycle. Some moisture from that air is adsorbed onto the relatively cool surfaces of walls 50, even though they are at 150°-170° F. Although exit chamber 16 has been pumped down to a relatively low pressure when a load enters the chamber, the radiated heat to furnace walls 50 drives off moisture. The sudden increase of moisture in the chamber reacts with magnesium evolving from the carrier load to form gases that flow back into the braze chamber 14 while door 26 is opened.

Figure 3:
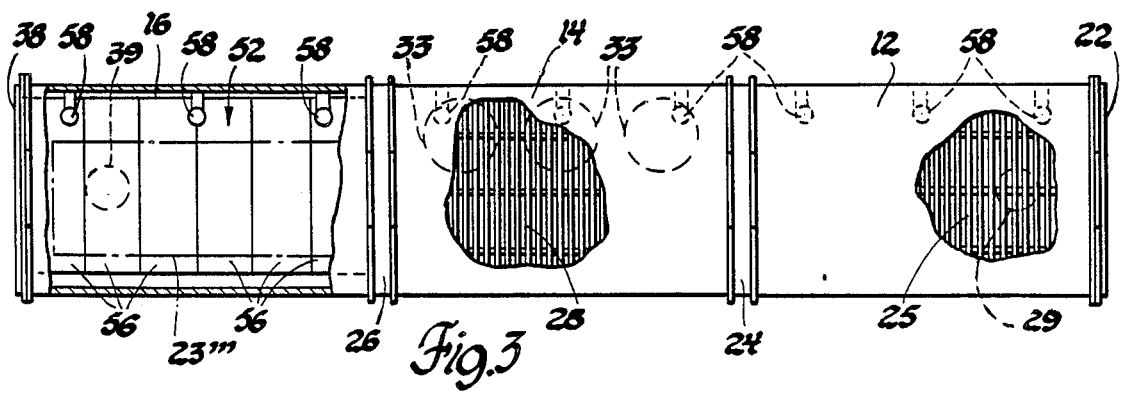
FIG. 3 is a longitudinal elevation view of the furnace partly broken away to illustrate the heat shield and other interior furnace parts.

Whatever the mechanism causing the increase in pressure, I have found that by placing sheets of plain carbon steel sheet between the carrier load 23''' and walls 50, the unwanted pressure fluctuations in chamber 14 are avoided. Heat shields are shown at 52 in FIGS. 2 and 3. Even though moisture accumulates on furnace walls 50, heat radiating from the carrier load is first received by the heat shields 52. The overall dimensions of each shield are about 18 feet long by 9 feet high by 1/10 inch thick. As best seen in FIG. 3, a shield is suitably formed of six individual sheets 56 of steel, each three feet wide by nine feet high. Each shield 52 may be supported on upper and lower rails carried on posts affixed to furnace wall 50. Such posts and rail are indicated at 54. The sheets 56 may simply abut each other as shown to form the shield 52.

Particles of magnesium and magnesium oxide that may be formed in the chamber are deposited on the heat shields 52. After door 26 is closed and as air is admitted to the chamber, the heat shields reradiate heat to the furnace walls 50 to promote vaporization of moisture from the walls. However, by this time the exit chamber 16 is isolated from the braze chamber 14 and the vacuum pumps remove the moisture and any gaseous reaction products of the vapor with magnesium. The mass of heat shields 52 are such that, in this application, they attain a maximum temperature of about 800° F. Magnesium and magnesium oxide will deposit on a surface at such temperature, and the shields are hot enough to slowly drive some moisture off walls 50 so that it can gradually be pumped out through duct 39.

Thus, I have found by employment of heat shields as indicated, reactions in the exit chamber that would adversely affect the braze environment in the braze chamber are avoided or delayed until the braze chamber door 26 is closed. As shown schematically in FIG. 3, heat shields may be adapted to accommodate conveyor shafts 58 and other necessary operating components of the exit chamber. In other words, the shields do not have to completely block all heat transfer from the brazed assemblies to the furnace walls. However, the shield must be of sufficient area and mass to delay an evolution of pressure increasing gases until door 26 is closed to isolate the braze chamber from the exit chamber. I have also found that the heat shields collect magnesium and magnesium oxide particles. It is easier to remove the particles from the heat shields than from the furnace walls. The shields may be of a solid material that can withstand the high temperature described above as well as the temperature fluctuations encountered in furnace operation.

While my invention has been described in terms of specific embodiments thereof, it will be appreciated that other forms could readily be adapted by those skilled in the art. Accordingly, the scope of my invention is to be considered limited only by the following claims.

The embodiments of the invention in which an exclusive property or privilege is claimed are defined as follows:

1. A furnace for vacuum brazing magnesium containing aluminum alloy workpieces, said furnace comprising a brazing chamber and an exit chamber, means for sequentially transporting the workpieces into and through said chambers and means comprising doors for isolating said chambers for each other and the ambient when the workpieces are being treated therein, the brazing chamber being adapted to accommodate heating of such workpieces to a brazing temperature at a sufficiently low pressure for magnesium gettered brazing to occur, the exit chamber comprising chamber defining walls and being adapted to initially receive hot brazed workpieces transported from the brazing chamber through a doorway between them at an exit chamber pressure compatible with the pressure in the brazing chamber, the exit chamber further comprising solid barriers to thermal radiation interposed between the hot workpieces and exit chamber walls.

2. A furnace for vacuum brazing magnesium containing aluminum alloy workpieces, said furnace comprising a brazing chamber and an exit chamber, means for continually and sequentially transporting the workpieces into and through said chambers and means comprising doors for cyclically isolating said chambers from each other and the ambient when the workpieces are being treated therein, the brazing chamber being adapted to accommodate heating of such workpieces to a brazing temperature at a sufficiently low pressure for magnesium gettered brazing to occur, the exit chamber comprising cooled chamber-defining walls and being adapted to initially receive hot brazed workpieces transported from the brazing chamber through a doorway between them at an exit chamber pressure compatible with the pressure in the brazing chamber, the exit chamber further comprising solid barriers to thermal radiation interposed between the hot workpieces and exit chamber walls, said barriers having sufficient mass to delay heating of the chamber walls by each introduction of the hot workpieces until the braze chamber again has been isolated from the exit chamber.

* * * * *